T. Noel.

Spectacle Frame.

No. 3,725. Reissued Nov. 9, 1869.

Witnesses:

William B. Wiggs

Patrick S. Hartley

Inventor:

Theodore Noel

N. PETERS, PHOTO-LITHOGRAPHER, WASHINGTON, D. C.

United States Patent Office.

ALBERT LORSCH, OF MEMPHIS, TENNESSEE, ASSIGNEE OF THEODORE NOEL.

*Letters Patent No.* 22,572, *dated January* 11, 1859; *reissue No.* 3,725, *dated November* 9, 1869.

IMPROVEMENT IN SPECTACLE-FRAMES.

The Schedule referred to in these Letters Patent and making part of the same

*To all whom it may concern:*

Be it known that THEODORE NOEL, of Memphis, in the State of Tennessee, heretofore invented a certain new and useful Improvement in Spectacle-Frames; and that the following is a full, clear, and exact description thereof, reference being had to the accompanying drawing, forming part of this specification, in which—

Figure 1:
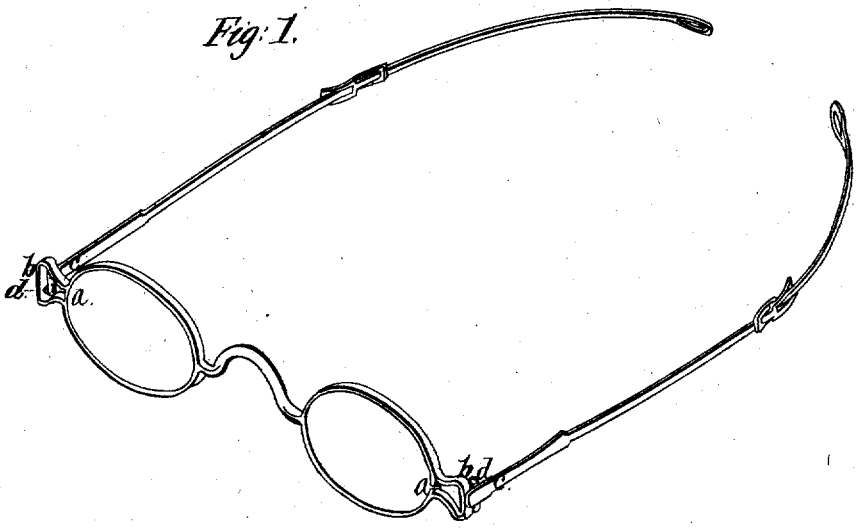
Figure 2:
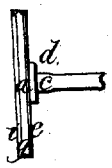

Figure 1 is a perspective view of a pair of spectacles, embodying this invention, and Figure 2 is a cross-section, taken on the plane of the line *x x*, fig. 1, showing an improved manner of connecting the temples with the eye-pieces.

This invention consists in the combination, with the eye-piece or frame of a pair of spectacles or eye-glasses, of a spring, secured thereto in such manner as to cause the said eye-piece to resume its normal position, after the same has been sprung so as to allow of the insertion or withdrawal of the glass, the continuity of the eye-piece being broken, so as to allow of its expanding, when it is desired to insert or introduce a glass, whereby one or more pairs of glasses, of different powers or colors, may be used alternately in the same frame, the user of the spectacles or eye-glasses being enabled to insert and withdraw the glasses with ease and celerity.

The eye-pieces of spectacles and eye-glasses are usually united by a screw, which passes through projecting portions of the frame, and hence, when it is desired to change a glass or insert a new one, it becomes necessary to remove said screw, and, after inserting the glass, to hold the eye-piece compressed against it, until the screw can be again inserted.

In the example of the invention illustrated in the drawings, there is shown a spring, applied to the eye-piece, at such point that the bows or temples may be applied thereto, and thereby, in addition to the advantages which result from the invention, there is produced a neat and ornamental joint or connection of the temples with the eye-pieces.

The frame, it will be observed, by reference to said drawings, is of the form or shape most generally adopted.

It is always preferred to make the eye-pieces oval, and bevelled from the outside down to the groove which receives the edge of the glass.

In the example shown, the improvement has been adapted to a pair of eye-pieces, which are constructed with the usual openings, as shown at *a*, in fig. 1.

Respective ends of a spring, *b*, are secured on opposite sides of the opening, and the spring is of such construction that its tendency is always to keep the eye-pieces closed, or nearly closed, upon the glasses, so that the same cannot expand and allow the glasses to slip out, except direct force be applied for such purpose.

The form of the spring should be such as to enable its extremities to be soldered or otherwise secured to an eye-piece, on opposite sides of the opening therein, and will permit it, when thus attached, to have the required elasticity to make the eye-pieces clasp the glasses tightly enough to confine them in place.

The springs shown in the drawing also furnish a convenient attachment of the temples or bows *c c* by hinges *d*.

These springs *b b* are represented as soldered to the eye-pieces, close to or near the openings *a a*.

The hinges *d d* for the temple-pieces are partly soldered to or formed upon the springs *b b*, and partly soldered to or formed upon the temple-pieces, and fitted with pins or rivets in the usual manner, the parts of the hinges soldered to or formed upon the temple-pieces being so arranged that the extremities of the temple-pieces constitute stops, which act against the springs *b b*, to prevent the temple-pieces opening too far.

To permit the glasses to be removed and replaced easily, the eye-pieces may have a very shallow bezel on that side on which the glasses are introduced and removed, preferably, the inner side, or side next the face, and the said bezel may be shallowest near the openings.

Fig. 2 exhibits the inside bezel, *e*, shallower than the outside one, *i*.

To insert a glass, first put one end, say the end next the nose-piece, in its place, and then hold the frame and glass between the thumbs and fingers of both hands, with the temple-pieces upward, apply gentle pressure near the opening, to draw the glass and eye-piece together, and the eye-piece yields to the glass, which slips over the bezel *e* into the groove *g*.

To remove the glass, hold the frame in the position last mentioned, and draw open the eye-piece very gently, while forcing the glass up with the tips of the fingers.

The springs may be made of any metal which is sufficiently flexible for the purpose. For instance, for steel frames, they may be of steel; for gold frames, of gold, from twelve to sixteen carats fine; and for silver frames, of a very low-carat gold.

It will be observed that a spring, applied to the eye-piece over the point where its continuity is broken, will have a tendency to keep the eye-piece in its normal condition when the glass is inserted, and will allow the said eye-piece to expand, to permit the insertion and withdrawal of the glass.

What is, therefore, claimed as the invention of the said THEODORE NOEL, and desired to be secured by Letters Patent, is—

1. The combination, with an eye-piece of a pair of spectacles or eye-glasses, of a spring, so arranged upon the eye-piece, over the point where its continuity is broken, that it will permit of the expansion of the said eye-piece, sufficiently to allow of the insertion and withdrawal of the glass, and thereafter cause the said eye-piece to resume its normal position, substantially as and for the purpose herein specified.

2. The combination of the spring *b* with the opening *a* and temple *c*, substantially as herein specified.

ALBERT LORSCH.

Witnesses:

M. M. LIVINGSTON,

T. B. BEECHER.